United States Patent [19]

Henderson et al.

[11] 4,016,743
[45] Apr. 12, 1977

[54] VARIABLE LEAK GAS SOURCE

[75] Inventors: Timothy M. Henderson; Gilbert H. Wuttke, both of Ann Arbor, Mich.

[73] Assignee: KMS Fusion, Inc., Ann Arbor, Mich.

[22] Filed: Oct. 4, 1974

[21] Appl. No.: 513,332

[52] U.S. Cl. ............................... 73/1 R; 73/40.7
[51] Int. Cl.² .................................. G01D 21/00
[58] Field of Search .............. 73/1 R, 40.7, 23.1; 252/316; 428/402, 406; 264/4, 5

[56] References Cited

UNITED STATES PATENTS

| | | | |
|---|---|---|---|
| 2,797,201 | 6/1957 | Veatch et al. | 264/5 X |
| 3,002,387 | 10/1961 | Micheletti | 73/23.1 X |
| 3,030,215 | 4/1962 | Veatch et al. | 428/406 X |
| 3,516,278 | 6/1970 | Klein et al. | 73/1 R |

OTHER PUBLICATIONS

O'Keeffe, A. E. et al Primary Standards for Trace Gas Analysis in Anal. Chem. 38(6): pp. 760–763, May 1966.

Primary Examiner—Richard C. Queisser
Assistant Examiner—Joseph W. Roskos
Attorney, Agent, or Firm—Barnes, Kisselle, Raisch & Choate

[57] ABSTRACT

A variable leak gas source and a method for obtaining the same which includes filling a quantity of hollow glass micro-spheres with a gas, storing said quantity in a confined chamber having a controllable outlet, heating said chamber above room temperature, and controlling the temperature of said chamber to control the quantity of gas passing out of said controllable outlet. Individual gas filled spheres may be utilized for calibration purposes by breaking a sphere having a known quantity of a known gas to calibrate a gas detection apparatus.

3 Claims, 1 Drawing Figure

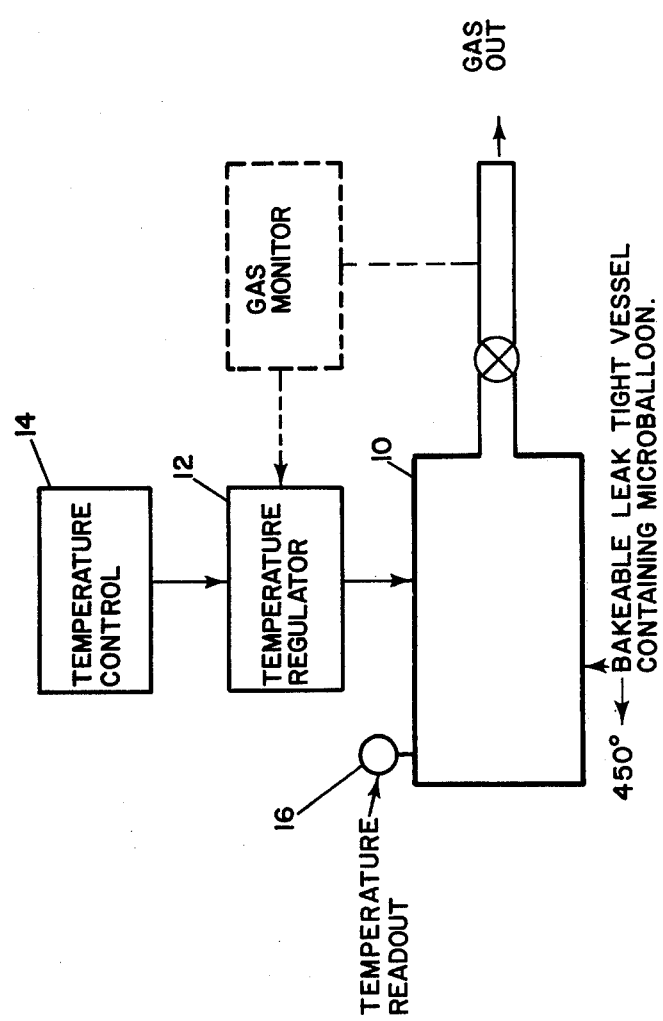

VARIABLE LEAK GAS SOURCE

This invention relates to a Variable Leak Gas Source.

It is the purpose of the invention to provide a stable, highly sensitive adjustable leak for a predetermined quantity of gas.

In the history of the art in this field, variable leak valves have been provided which are controlled with finger knob adjustments.

The object of the present invention is to provide a very stable, highly sensitive adjustable leak system which will have lower minimum leak rates and an increased control for sensitivity.

A further object is to provide a variable leak source which is inexpensive and expendable and when used for tritium is particularly safe because of the double containment. Contamination from tritium is caused by inhaling the gas or through drinking water. The present system provides safety against contamination of the atmosphere with tritium.

Further objects of the invention will be apparent in the following description and claims in which the principles of the invention, together with the best mode presently contemplated, are set forth.

A single DRAWING accompanies the disclosure showing a layout diagram of the elements of the system.

The basic principle of the present invention lies in the fact that thin wall vessels of glass are permeable to helium and to other gases such as hydrogen, isotopes of hydrogen and a few other gases. This permeability increases at higher temperatures. Thus, in accordance with the present invention, small glass spheres having diameters from 10 to 300 micrometers and a wall thickness of about 1 micrometer are pressurized by diffusing gas through the walls at a temperature of about 300° C.

It has been found that this can be accomplished by surrounding the small glass spheres with a gas such as helium or hydrogen at a pressure of about 100 atmospheres. Room temperature final pressure of the hydrogen isotopes of about 100 atmospheres can be obtained by exposing the small glass spheres as above described for about two days. The diffusion times of other light gases would vary but not to the extent that it would be impractical to obtain the filling of the small glass spheres by diffusion.

It would be understood that the aforesaid small glass spheres are commercially available. After the filling operation and the reduction of the pressure to room temperatures, the pressurized glass spheres are enclosed in a leak tight bakeable vessel as shown in the drawing at 10. The out diffusion rate from the small glass spheres varies exponentially with the temperature. Accordingly, after the small glass spheres are charged into the vessel 10, the temperature of the vessel may be controlled by a temperature regulator 12 actuated by a temperature control unit 14.

A temperature read-out gauge 16 is provided on the vessel 10. The leak rate then from the vessel 10 can be established by controlling the temperature of the vessel which will cause the gas to diffuse out at a rate depending on the temperature. In the particular case of tritium, a tritium detection system can be used as a regulator either to control the temperature or to control the variable leak valve.

It will be seen that small glass spheres filled in accordance with the above system, which are well characterized, that is, classified as to size and quantity of fill, can be removed from a batch and ruptured individually to introduce a measured quantity of gas into other vessels. For example, a micro-syringe method may be used for introducing trace amounts of tritium for biological studies and radiochemistry.

It will be appreciated that for extreme accuracy, the small glass spheres may be evacuated at elevated temperatures, for example, 300° to 400° C. prior to the charging with the desired resultant gas. After a desired sample of filled glass spheres have been analyzed and characterized to determine the quantity of gas contained for a given internal volume, the small glass spheres can be used to calibrate various gas analysis equipment by breaking them within an appropriate detection device. In addition, small glass spheres which are charcterized only as to the quality of the gas may be used as markers in the sense that they will identify in a qualitative way only the points of spectrum without regard to gas quantity. This, of course, can be done without the need of a container vessel except for storage. The small glass spheres can be introduced into the vicinity of an ionization chamber of a spectrometer by means of a hypodermic needle with a side port and ram rod.

When the calibration gas is desired, the plunger of the syringe is actuated and the glass sphere breaks releasing the gas. It would be possible to provide the filled glass spheres together with the syringes with various gases such as helium, hydrogen, deuterium, tritium, neon and combinations of these. If desired, also the spheres could be stored under cryogenic conditions at temperatures ranging from 5° to 80° K and thus higher pressures could be available under these circumstances.

What we claim is:

1. A method of obtaining a variable calibrated leak source of gas which comprises:
    a. storing at a predetermined temperature a quantity of hollow, glass, gas-filled, microspheres ranging in size from 10 to 300 micrometers in a confined chamber having a controlled outlet, said gas having the characteristic of permeating through glass and being present in said spheres in a predetermined and known quantity, and
    b. causing the egress of said gas from said spheres for purpose of gas calibration.

2. A method of obtaining a variable calibrated leak source of gas which comprises:
    a. storing at a predetermined temperature a quantity of hollow, glass, gas-filled microspheres in a confined chamber having a controlled outlet, said gas having the characteristic of permeating through glass,
    b. heating said chamber above said predetermined temperature to cause the egress of gas by permeation through the walls of said microspheres, and
    c. controlling the heating temperature of said chamber to control the quantity of gas emitted through said controlled outlet.

3. A method of obtaining a variable calibrated leak source of gas which comprises:
    a. storing at a predetemined temperature a quantity of hollow, glass, gas-filled, microspheres ranging in size from 10 to 300 micrometers in a confined chamber having a controlled outlet, said gas having the characteristic of permeating through glass and being present in said spheres in a predetermined and known quantity, b. heating said chamber and said contained spheres above said predetermined temperature to cause the egress of gas by permeation through the walls of said microspheres into said chamber,
c. controlling the heating temperature of said chamber to control the quantity of gas discharging from said spheres, and
d. utilizing said gas quantity by opening said controlled outlet for calibration.

* * * * *